United States Patent
Woolley et al.

(10) Patent No.: US 8,933,892 B2
(45) Date of Patent: Jan. 13, 2015

(54) TOUCHPAD COMBINED WITH A DISPLAY AND HAVING PROXIMITY AND TOUCH SENSING CAPABILITIES TO ENABLE DIFFERENT FUNCTIONS OR INTERFACES TO BE DISPLAYED

(75) Inventors: Richard D. Woolley, Orem, UT (US); Chris Oshima, Campbell, CA (US)

(73) Assignee: Cirque Corporation, Salt Lake City, UT (US)

( * ) Notice: Subject to any disclaimer, the term of this patent is extended or adjusted under 35 U.S.C. 154(b) by 312 days.

(21) Appl. No.: 12/274,260

(22) Filed: Nov. 19, 2008

(65) Prior Publication Data
US 2009/0219255 A1 Sep. 3, 2009

Related U.S. Application Data

(60) Provisional application No. 60/989,047, filed on Nov. 19, 2007, provisional application No. 61/128,529, filed on May 22, 2008.

(51) Int. Cl.
G06F 3/041 (2006.01)
G06F 3/044 (2006.01)

(52) U.S. Cl.
CPC .............. G06F 3/0416 (2013.01); G06F 3/044 (2013.01); *G06F 2203/04108* (2013.01)
USPC ............................ 345/173; 345/156; 345/168

(58) Field of Classification Search
CPC .................. G06F 3/0416; G06F 3/044; G06F 2203/04108; G06F 1/1626; G06F 3/03547; G06F 3/0488; H04M 2250/22

USPC .................. 345/173, 175, 156, 168; 715/863; 341/20

See application file for complete search history.

(56) References Cited

U.S. PATENT DOCUMENTS

| | | | |
|---|---|---|---|
| 6,920,619 B1 | 7/2005 | Milekic | |
| 7,088,343 B2 * | 8/2006 | Smith et al. .................... | 345/173 |
| 2006/0022958 A1 * | 2/2006 | Shiga ............................. | 345/173 |
| 2006/0197750 A1 * | 9/2006 | Kerr et al. ...................... | 345/173 |
| 2006/0274046 A1 | 12/2006 | Hillis et al. | |
| 2007/0130547 A1 * | 6/2007 | Boillot .......................... | 715/863 |
| 2007/0211031 A1 * | 9/2007 | Marc .............................. | 345/163 |
| 2008/0158168 A1 * | 7/2008 | Westerman et al. .......... | 345/173 |
| 2008/0165160 A1 * | 7/2008 | Kocienda et al. ............. | 345/175 |
| 2008/0174570 A1 * | 7/2008 | Jobs et al. ..................... | 345/173 |
| 2008/0320419 A1 * | 12/2008 | Matas et al. ................... | 715/863 |
| 2009/0002199 A1 * | 1/2009 | Lainonen et al. .............. | 341/20 |
| 2009/0241072 A1 * | 9/2009 | Chaudhri et al. ............. | 715/863 |

FOREIGN PATENT DOCUMENTS

| | | |
|---|---|---|
| JP | 2003044223 A | 2/2003 |
| JP | 2005031799 A | 2/2005 |
| WO | WO 2007/123648 | 11/2007 |

\* cited by examiner

*Primary Examiner* — Thuy Pardo
(74) *Attorney, Agent, or Firm* — Morriss O'Bryant Compagni, PC

(57) ABSTRACT

A touch-sensitive and far-field or proximity sensitive touchpad combined with a display, wherein the touchpad is formed as a touchstrip that is concealed inside the display, wherein a first function or interface such as a menu is enabled when an actuating device reaches a threshold distance from the touchpad, wherein a second function or interface is enabled when the actuating device makes contact with the touchpad, and wherein the first function may or may not continue after contact is made with the touchpad.

11 Claims, 5 Drawing Sheets

FINGER POSITIONS

TOUCHPAD COMBINED WITH A DISPLAY AND HAVING PROXIMITY AND TOUCH SENSING CAPABILITIES TO ENABLE DIFFERENT FUNCTIONS OR INTERFACES TO BE DISPLAYED

CROSS REFERENCE TO RELATED APPLICATIONS

This document claims priority to and incorporates by reference all of the subject matter included in the provisional patent application having Ser. No. 60/989,047 and filed on Nov. 19, 2007, having Ser. No. 61/128,529 and filed on May 22, 2008.

BACKGROUND OF THE INVENTION

1. Field of the Invention

This invention relates generally to electronic appliances that combine touchpad capabilities and a display, wherein a first function or interface is made active when an actuating device is detected in proximity of a touchpad, and wherein a second function or interface is made active when the actuating device makes contact with the touchpad.

2. Description of Related Art

Touchpads have been combined with a display or display screen (referred to hereinafter as a "display") to provide added functionality or different means of providing input. Consider the display that includes a touch-sensitive strip disposed around a perimeter of a display. The touchstrip was provided to add the ability to scroll by moving a finger along the touchstrip. What was apparent from the prior art is that the touchstrip required contact in order to perform any function, and the function described was limited in scope to scrolling.

It is useful to describe one embodiment of touchpad technology that can be used in the present invention. Specifically, the capacitance-sensitive touchpad technology of CIRQUE® Corporation can be used to implement the present invention when combined with a display, such as a liquid crystal display (LCD). The CIRQUE® Corporation touchpad is a mutual capacitance-sensing device and an example is illustrated in FIG. 1. The touchpad can be implemented using an opaque surface or using a transparent surface. Thus, the touchpad can be operated as a conventional touchpad or as a touch sensitive surface on a display, and thus as a touch screen.

In this touchpad technology of CIRQUE® Corporation, a grid of row and column electrodes is used to define the touch-sensitive area of the touchpad. Typically, the touchpad is a rectangular grid of approximately 16 by 12 electrodes, or 8 by 6 electrodes when there are space constraints. Interlaced with these row and column electrodes is a single sense electrode. All position measurements are made through the sense electrode. However, the row and column electrodes can also act as the sense electrode, so the important aspect is that at least one electrode is driving a signal, and another electrode is used for detection of a signal.

In more detail, FIG. 1 shows a capacitance sensitive touchpad 10 as taught by Cirque® Corporation includes a grid of row (12) and column (14) (or X and Y) electrodes in a touchpad electrode grid. All measurements of touchpad parameters are taken from a single sense electrode 16 also disposed on the touchpad electrode grid, and not from the X or Y electrodes 12, 14. No fixed reference point is used for measurements. Touchpad sensor control circuitry 20 generates signals from P,N generators 22, 24 that are sent directly to the X and Y electrodes 12, 14 in various patterns. Accordingly, there is a one-to-one correspondence between the number of electrodes on the touchpad electrode grid, and the number of drive pins on the touchpad sensor control circuitry 20.

The touchpad 10 does not depend upon an absolute capacitive measurement to determine the location of a finger (or other capacitive object) on the touchpad surface. The touchpad 10 measures an imbalance in electrical charge to the sense line 16. When no pointing object is on the touchpad 10, the touchpad sensor control circuitry 20 is in a balanced state, and there is no signal on the sense line 16. There may or may not be a capacitive charge on the electrodes 12, 14. In the methodology of CIRQUE® Corporation, that is irrelevant. When a pointing device creates imbalance because of capacitive coupling, a change in capacitance occurs on the plurality of electrodes 12, 14 that comprise the touchpad electrode grid. What is measured is the change in capacitance, and not the absolute capacitance value on the electrodes 12, 14. The touchpad 10 determines the change in capacitance by measuring the amount of charge that must be injected onto the sense line 16 to reestablish or regain balance on the sense line.

The touchpad 10 must make two complete measurement cycles for the X electrodes 12 and for the Y electrodes 14 (four complete measurements) in order to determine the position of a pointing object such as a finger. The steps are as follows for both the X 12 and the Y 14 electrodes:

First, a group of electrodes (say a select group of the X electrodes 12) are driven with a first signal from P, N generator 22 and a first measurement using mutual capacitance measurement device 26 is taken to determine the location of the largest signal. However, it is not possible from this one measurement to know whether the finger is on one side or the other of the closest electrode to the largest signal.

Next, shifting by one electrode to one side of the closest electrode, the group of electrodes is again driven with a signal. In other words, the electrode immediately to the one side of the group is added, while the electrode on the opposite side of the original group is no longer driven.

Third, the new group of electrodes is driven and a second measurement is taken.

Finally, using an equation that compares the magnitude of the two signals measured, the location of the finger is determined.

Accordingly, the touchpad 10 measures a change in capacitance in order to determine the location of a finger. All of this hardware and the methodology described above assume that the touchpad sensor control circuitry 20 is directly driving the electrodes 12, 14 of the touchpad 10. Thus, for a typical 12×16 electrode grid touchpad, there are a total of 28 pins (12+16=28) available from the touchpad sensor control circuitry 20 that are used to drive the electrodes 12, 14 of the electrode grid.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes on the same rows and columns, and other factors that are not material to the present invention.

Although the CIRQUE® touchpad described above uses a grid of X and Y electrodes and a separate and single sense electrode, the sense electrode can also be the X or Y electrodes by using multiplexing. Either design will enable the present invention to function.

The underlying technology for the CIRQUE® Corporation touchpad is based on capacitive sensors. However, other touchpad technologies can also be used for the present invention. These other proximity-sensitive and touch-sensitive touchpad technologies include electromagnetic, inductive, pressure sensing, electrostatic, ultrasonic, optical, resistive membrane, semi-conductive membrane or other finger or stylus-responsive technology.

Having identified the technology that can be used to implement the invention, it should also be understood that the prior art fails to teach the ability to change the output on a display without making contact with a touch interface. For example, the prior art is replete with examples of using a touchpad or a touch screen to control input and have a result shown on a display. However, the prior art fails to show how a proximity sensitive device can track movement of a non-touching object, and still affect the output shown on a display.

Accordingly, what is needed is a touchpad or touch screen that is capable of far-field or proximity sensing as well as touch sensing, and wherein the touchpad or touch screen are combined with a display. It would be an advantage to provide proximity sensing of an object such as a user's hand that could perform proximity gesturing, wherein a gesture performed in three dimensional space within a sensing region of the touchpad or touch screen will be used as input to perform a desired function, send a command, or cause a particular interface to be displayed and/or interacted with by the proximity or touch input.

BRIEF SUMMARY OF THE INVENTION

It is an object of the present invention to provide a touch-sensitive and far-field or proximity sensitive touchpad or touch screen (hereinafter to be referred to collectively as a touchpad), and combined with a display.

It is another object to dispose the touchpad underneath a front bezel, a side panel, a rear panel, or any combination of the three on a display.

It is another object to dispose the touchpad in a location of the display that enables detection and tracking of an object in three-dimensional space, to thereby enable proximity gesturing.

It is another object to enable the display to show a first interface or perform a first function when an actuating device such as a finger moves to within a detectable distance of the touchpad.

It is another object for the first function to be the display of a menu, wherein the touchpad can use proximity sensing or touch sensing to determine which item is being selected from the displayed menu.

It is another object for the touchpad to use proximity or touch sensing to scroll through items shown in the menu and perform page turning.

It is another object for the touchpad to use proximity or touch sensing to select an item being shown in the menu.

It is another object to be able to sense a direction from which a finger is approaching the touchpad.

It is another object to perform proximity gestures that enable non-touching gestures performed in three-dimensional space within a sensing area of the touchpad to cause functions or commands to be executed or interfaces to be displayed or to change.

In a preferred embodiment, the present invention is a touch-sensitive and far-field or proximity sensitive touchpad or touch screen combined with a display, wherein the touchpad is formed as a touchstrip that is concealed inside the display housing, wherein a first function, interface or command is shown, changed or executed when an actuating device reaches a threshold distance from the touchpad, wherein a second function or interface is enabled when the actuating device makes contact with the touchpad, and wherein proximity gestures can be performed in three-dimensional space within range of the touchpad but without requiring contact.

In a first aspect of the invention, the touchpad is formed as a narrow strip that enables movement of a pointing object along a lengthwise axis of the touchpad.

In a second aspect of the invention, the touchpad is implemented as a single-layer touchpad that is capable of detection of movement along a single axis.

In a third aspect of the invention, the touchpad is implemented as a multi-layer general purpose touchpad that can detect movement in two or three dimensions.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

From the aspect of hardware, the present invention is a display combined with a touchpad (or touch screen) that includes both proximity sensing and touch sensing capabilities. The present invention relates to how this hardware is disposed in relation to a display, and how the hardware is then used.

The use of the present invention is related to proximity functions and touch functions. Regarding proximity functions, this can be as simple as detection and tracking movement of the actuating object. Of more complexity is the aspect of proximity gestures. Proximity gestures are defined as movement of an actuating object in a way that can be detected by the touchpad. In other words, a specific movement in three-dimensional space that can be identified is then associated with or defines an action to be performed. Actions include such things as performing a function or executing a command, activating an interface, or changing an interface. These actions should not be considered as limiting but are only examples.

Figure 1:
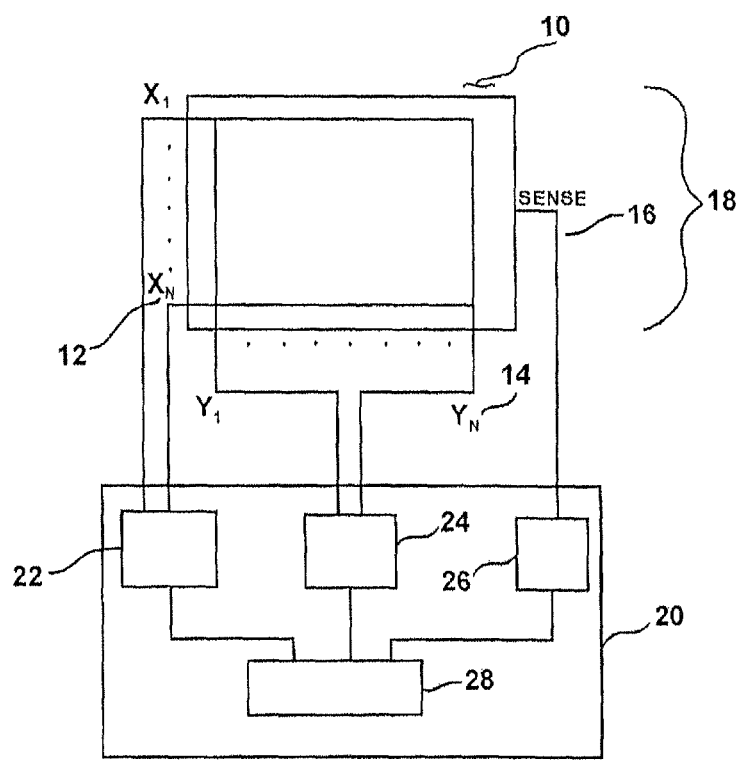
FIG. 1 is a block diagram of the components of a capacitance-sensitive touchpad as made by CIRQUE® Corporation and which can be operated in accordance with the principles of the present invention.
Figure 2:
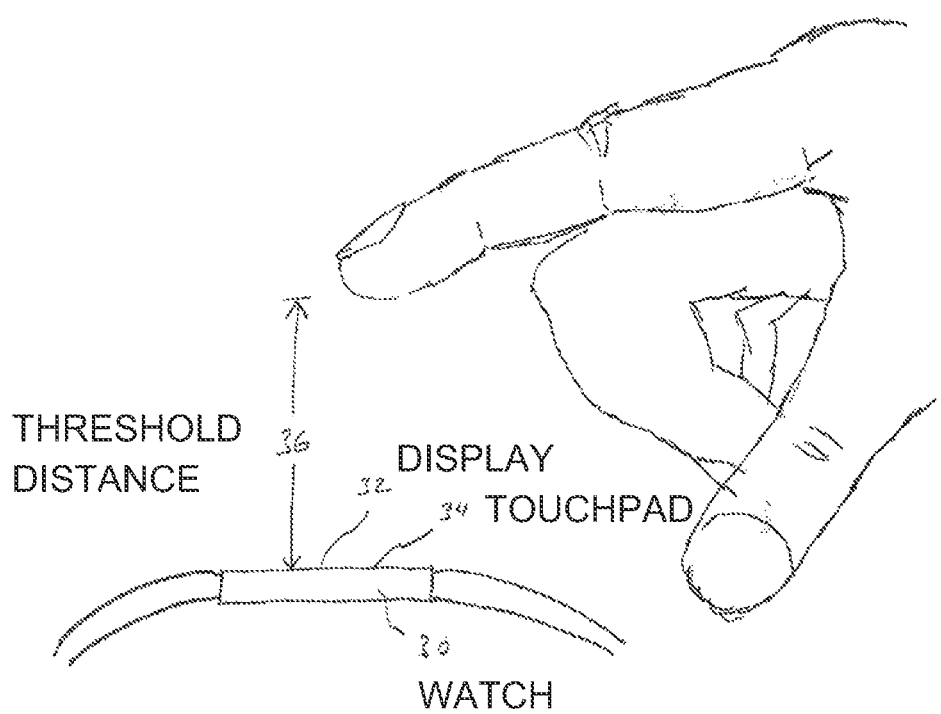
FIG. 2 is a profile view of a finger above a watch that includes a touch and proximity sensitive touchpad.

A first embodiment of the present invention is shown in FIG. 2. FIG. 2 is a side view of an electronic appliance, which is this example is a watch 30. The example of a watch 30 is for illustration purposes only, and should not be considered to be a limiting example. Thus, any electronic appliance, portable or stationary, can be substituted for the watch 30. What is important to understand is that the watch 30 includes a display and a touchpad including both proximity and touch sensing capabilities.

In FIG. 2, an actuating device, which in this example is a user's finger, is brought to within a threshold distance 36 of the watch 30. The threshold distance 36 is the distance at which the actuating device is detectable by the touchpad 34 without making physical contact. The threshold distance 36 can vary significantly depending upon the technology being used for the touchpad 34, for the display 32, and for the configuration of the touchpad and the display in relationship to each other. What is important for the present invention is that the touchpad 34 is capable of detecting the actuating device before physical contact is made. Thus, the actual threshold distance 36 may vary.

In this example, the watch 30 includes an LCD display 32, but any suitable display that can be combined with a touchpad 34 can be used. It is also important to understand that the touchpad 34 can be disposed on top of the display 32 or underneath. Making contact with the display 32 if the touchpad 34 is disposed underneath will satisfy the requirement of "physical contact" with the touchpad.

The embodiment above envisions that the touchpad 34 is on top of or underneath an LCD. However, in an alternative embodiment, the touchpad 34 is integrated into the technology of the display. For example, electrodes used to implement display technology can also be used as the electrodes of the touchpad 34.

Once the actuating device is detected at the threshold distance 36, either a first function, a first interface or both are actuated. For example, consider the watch 30. When the finger reaches the threshold distance 36, a light 38 in the watch 30 may be activated to illuminate the watch so that it can display the present time. This is a function.

An example of an interface is to display a menu or virtual buttons on the display 32 that could be used to set the present time or date, or a combination of a menu and virtual buttons.

It may be desirable to activate both a function and an interface at the same time. For example, the light 38 is illuminated and the virtual buttons are displayed when the threshold distance 36 is reached. It should be noted that the user does not have to make contact with the touchpad 34 after reaching the threshold distance 36. Actuating a first function may be all that is desired.

After a function, an interface or both are actuated on the display 32, it may be desirable to perform a second function, activate a second interface, or both. This second function or interface can be activated by movement or touch.

For example, the second function or interface can be activated by moving the actuating device in a proximity gesture. The proximity gesture might be a simple movement of the actuating device closer to the touchpad 34, or it could be a different movement.

The second function or interface might also be activated by touch. Thus, the actuating device can be moved until it makes contact with the touchpad 34. No limitation is being made or suggested as to what actions are being caused to happen by proximity gestures or touching of the touchpad 34 by the actuating device. Thus by way of example only, making contact could result in the following actions. The first function and/or interface may be deactivated and a second function and/or interface may be activated. The first function and/or interface activated, and then a second function and/or interface is activated. In other words, the first function and/or interface do not have to be mutually exclusive events or actions. The functions and/or interfaces may or may not conflict, so it may be possible to activate a first function and interface, but then only deactivate only one of the first function or interface when contact is made and the second function and/or interface is activated.

The proximity gestures that can be detected by the present invention are any gestures that can be performed by a detectable object. Such gestures includes such actions as moving a finger towards the touchpad 34, moving the finger away from the touchpad, moving the finger in a specific motion such as making a circling motion, or manipulating the actuating device so that the shape of the actuating device can be defined as a gesture. For example, bringing all the fingers of a hand together so that the hand is flat could be a recognizable gesture. Extending the thumb from the flat hand could be another gesture. Thus, proximity gestures include recognizable movements and recognizable shapes of the actuating device.

In summary, actions do not have to be mutually exclusive events. A first function or interface that is caused to be executed or to appear may be modified by a subsequent action, or may not be affected at all by a subsequent action. Thus, a first function or interface might be executed or displayed as a result of a proximity gesture, such as the approach of a finger. Subsequent proximity and/or touch gestures will then activate corresponding different functions and/or interfaces.

Another aspect of the invention is the ability to provide multiple layers of touchpad interfaces or menus to a user. Using the example of the watch 30, a first interface may show virtual buttons for changing the time. After contact is made and the time is or is not adjusted, the user may be able to change the virtual buttons so that they are now used for the input of a date. Accordingly, multiple menus can be displayed, with the possibility of each menu being arranged differently from others. For example, a first interface may provide a circular scrolling wheel function for changing time, and a second interface may provide a linear scrolling bar function for changing a date, wherein the circular scrolling wheel and the linear scrolling bar occupy much of same space as shown on the display 32.

Another useful aspect of the invention is that the touchpad can provide touchpad zones that are capable of functioning as buttons themselves. Touchpad zones are typically provided by a single layer touchpad that does not provide more complex touchpad functionality, but is instead limited to providing button input. In a related concept, a proximity gesture or a particular button on the touchpad surface activates a desired arrangement of virtual touchpad buttons. Similarly, a mechanical button can be used to bring up a selected arrangement of virtual touchpad buttons.

The embodiments above have been directed to a touchpad that is combined with a display. Alternatively, the touchpad is not combined with a display. Consider a touchpad disposed beneath a keypad of a stationary or portable electronic appliance such as a mobile telephone. Bringing an actuating device such as a hand or finger near the keypad could "wake" the mobile telephone from a sleep mode. Likewise, the opposite function could also be performed by putting the stationary or portable electronic appliance into a "sleep" mode by performing a proximity gesture. Such a proximity gesture could be the placing of the entire hand over the device without touching.

The technology of the present invention can also be used to provide a new interface on a display. The display technology is not relevant to the present invention, so it can be of any type, including but not limited to LCD, plasma, OLED or DLP. The display can be part of any type of processing or visual media device. For example, the display can be part of a computer or it can be part of a television or entertainment center.

The touchpad that is used in this embodiment can also be referred to as a touchstrip which is simply a specialized touchpad either because of its shape, its functionality or both. The shape of the touchstrip is generally going to be long and thin so that it can be placed in a narrow location, or easily confined to a narrow area of a larger device. In this embodiment, the location is in the bezel of a display. However, the touchstrip can also be disposed inside devices that are not displays, such as the housing for a light switch.

The functionality of the touchstrip is also usually going to be limited, but it does not have to be. Typically, a touchstrip only provides tracking of a pointing object in a single dimension, such as along its long axis. The touchstrip is then useful for applications such as scrolling or making selections from a list of items being shown in a column. Scrolling can also be defined as increasing or decreasing the value of some variable parameter, such as the intensity of light being controlled by a light switch.

Even though a touchstrip typically provides one-dimensional functionality, the present invention can also be implemented with a touchstrip that is also capable of tracking movement in two dimensions. If the touchstrip is only capable of tracking movement in a single dimension and detecting touchdown in regions or zones, then the touchstrip can be created using a single-layer touchpad, but is not limited to such. If the touchstrip is capable of tracking motion in two dimensions, then it can be created using general purpose multi-layer touchpad technology.

Figure 3:
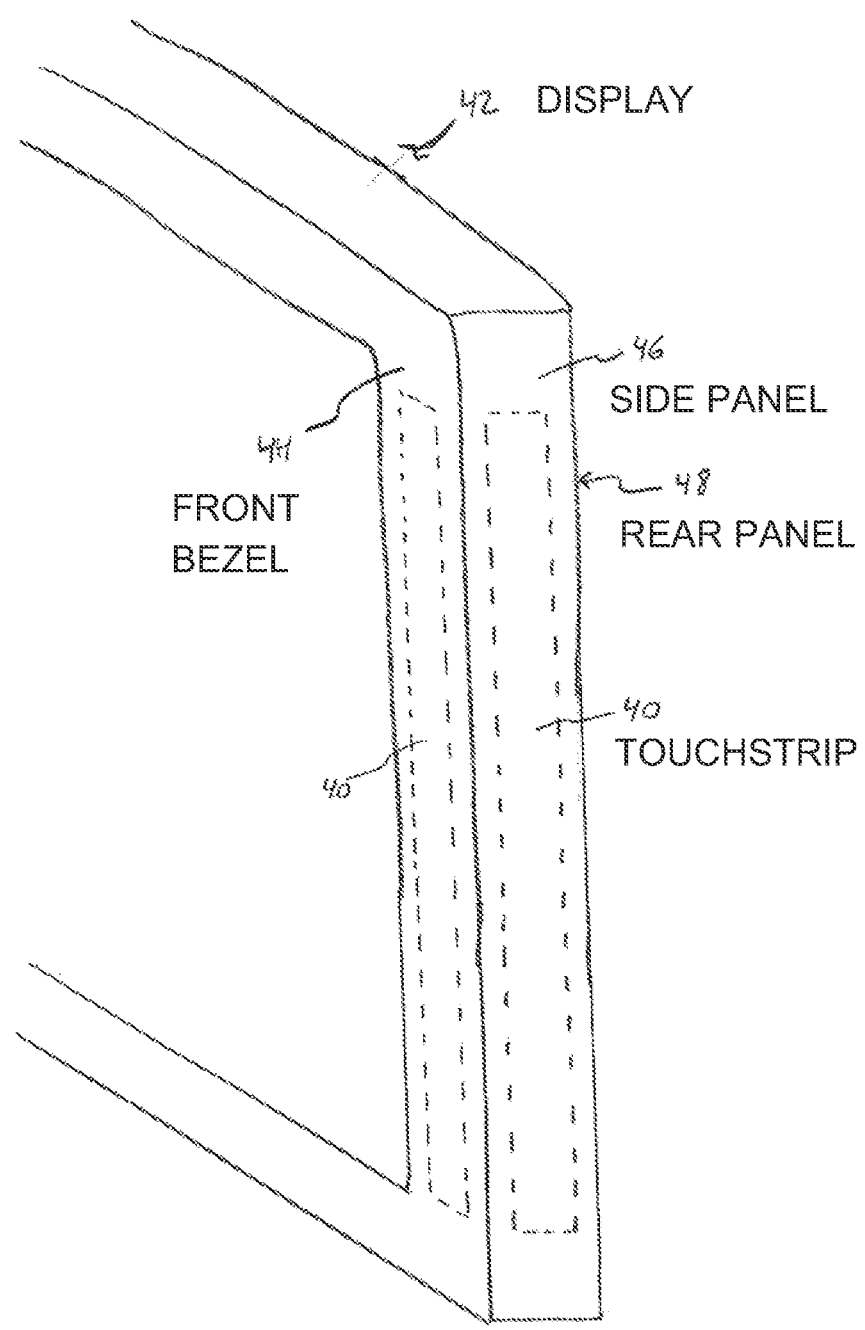
FIG. 3 is a perspective view of a display that has concealed within it one or more touchstrips that are disposed under the front bezel, the side panel or the rear panel.

FIG. 3 is another embodiment of the present invention wherein the touchstrip 40 is shown as being placed on a perimeter of the display 42. In contrast to the prior art which places the touchstrip on a top surface of an outer edge of a display housing, the perimeter of the display 42 in the present invention is defined as being enclosed within or being on an inside surface of an outer edge of a display housing. Specifically, the touchstrip 40 is disposed underneath a front bezel 44, underneath a side panel 46, underneath a rear panel 48 (not shown but placed similar to the other touchstrips shown near a perimeter of the display 42), or any combination of the three locations. The touchstrip 40 is shown as a dotted line representing a possible outline of the touchstrip on the inside surfaces. The length of the touchstrip 40 is also adjustable. If the touchpad is disposed in more than one location, it will bend around corners to cover the desired inside surfaces of the housing.

The materials used in the construction of a housing unit for a display such as computer monitor or a television are materials that typically do not interfere with the normal operation of a touchpad. Accordingly, it is important that the housing should not contain metal or other conductive materials which can interfere with normal touchpad operation. This limitation also applies to a housing that is not part of a display.

Concealing the touchstrip 40 on an inside surface of the display 42 provides several advantages over the prior art. For example, the touchstrip 40 is completely protected from any damage that might occur to the touchstrip from any object that bumps into or scrapes against the display 42. Thus, the durability of the design of the present invention is significantly improved. This design change is not typical for touchpads that are generally installed as touch sensitive devices and not proximity sensitive ones.

Concealing the touchstrip 40 within the display 42 also eliminates the need to redesign the housing for the display. The prior art teaches that a groove or indentation should be created in the display to accommodate the presence of the touchstrip. This modification can be costly. In addition, there is a need to create holes through the display so that touchstrip sensor circuitry can make contact with the touchpad sensor placed on the outside of the display.

In contrast, the present invention does not require any modification to the outside of the housing of existing displays 42 because the touchstrip sensors and the touchstrip sensor circuitry are both inside the display. Thus, the cost of installing the touchstrip 40 is significantly reduced.

For the touchstrip 40 of the present invention to operate as desired, it is preferable that the touchstrip be capable of both touch and proximity sensing because it is disposed underneath the front bezel 44, underneath the side panel 46, underneath the rear panel 48, or any combination thereof. Touching the surface of the front bezel 44, the side panel 46 or the rear panel 48 is defined as touching the touchstrip 40, while any detection and tracking of a pointing object without making contact with any part of the display 42 or its housing is defined as proximity sensing.

The touchstrip 40 provides all of the functionality of the touchpad or touchscreen shown in the first embodiment of the present invention. Therefore, the touchstrip 40 is capable of detection of a pointing object, such as a finger or hand, before contact is made with the front bezel 44, the side panel 46 or the rear panel 48.

A typical application of the touchstrip 40 in this embodiment is the presentation of a menu, an icon or a plurality of icons on the display when a pointing object comes within a threshold activation distance of the touchstrip. For example, a user brings a finger close to a perimeter of the display 42. When the finger is detected, the display 42 is caused to show a menu that may include virtual buttons, show a single icon, or show a plurality of icons.

Consider the example of the touchstrip disposed in various devices such as a laptop computer, an electronic book or eBook reader or a digital picture frame. In an eBook, the user might wave a hand over a top section of an eBook display to cause pages to turn in one direction, and wave a hand over a bottom section to cause pages to turn in an opposite direction. Alternatively, moving a hand in a first direction over the top section might cause pages to turn in the first direction, while moving the hand in a second direction that is opposite the first direction but still over the top section might cause pages to turn in a direction that is opposite to the first direction.

In the example of the digital picture frame, a long range sensor might detect the approach or passing of a person and so be activated. The user might then wave a hand or finger over the frame to cause the pictures to increment in a desired direction. Placing the hand over the entire picture or a significant portion thereof could also be interpreted as a command to enter a sleep mode.

Figure 4:
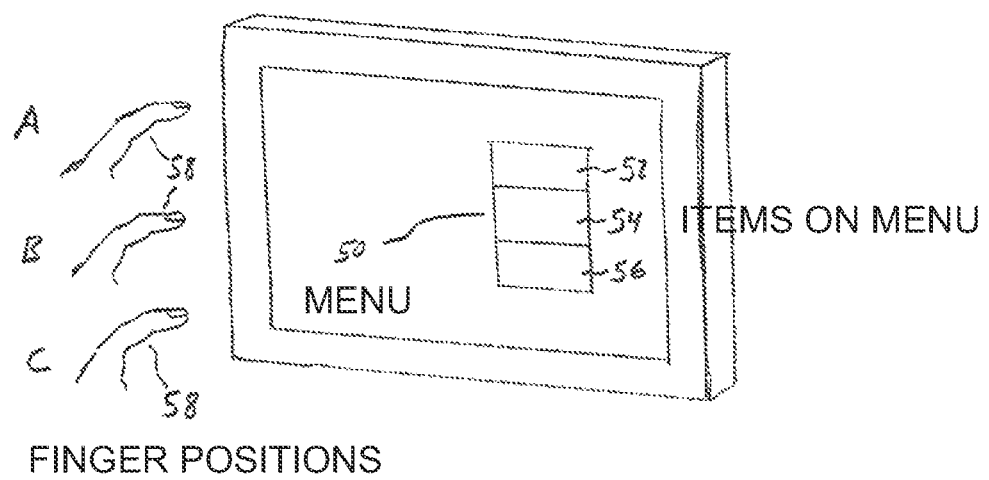
FIG. 4 is a perspective view of a finger that is detected by a proximity-sensitive touchstrip, wherein a menu activated by detection is operated by the finger moving in space above the touchstrip.

FIG. 4 shows that in a first scenario, the user does not make contact with the touchstrip 40, but moves a finger within a detection threshold distance. Upon detection of the finger by the touchstrip 40, a menu 50 is caused to appear on the display 42. The user then moves the finger so that different portions of the menu 50 are highlighted. For example, at position A, the first item 52 is highlighted on the menu 50, at position B the second item 54 is highlighted on the menu, and finally at position C the third item 56 is highlighted on the menu. The number of items on the menu 50 can be any number and is not limited by the example above. Alternatively, the user could also touch the housing after the menu is activated, sliding a finger up and down the menu options to highlight a particular menu item. Once a selection is made, the user could have selected a function that can be further manipulated by moving the finger up and down the housing. Examples of functions include volume control, zooming, scrolling, etc.

Once an item on the menu is highlighted, the user needs to make a selection. To make a selection, the user moves the finger 58 to make direct contact with the touchstrip 40. Alternatively, the user might perform a proximity gesture by moving the finger 58 closer to the display 42 but without making contact. The touchstrip 40 of the present invention is capable of detecting this change in position of the finger, which can be defined as making a selection.

The menu 50 is shown in FIG. 4 as being arranged as a vertical column of options. The menu 50 can also be a horizontal column of options, with the finger moving back and forth horizontally to make a selection instead of vertically as shown in FIG. 4.

In an alternative embodiment, the user must make contact with the touchstrip 40 in order to make a change regarding which option on the menu 50 is highlighted. To make the change, the finger slides along the touchstrip 40. The highlighted menu option is then selected by some other action such as, but not limited to, lifting the finger off the touchstrip 40, tapping or double-tapping on the touchstrip, or waiting for a predetermined length of time.

Figure 5:
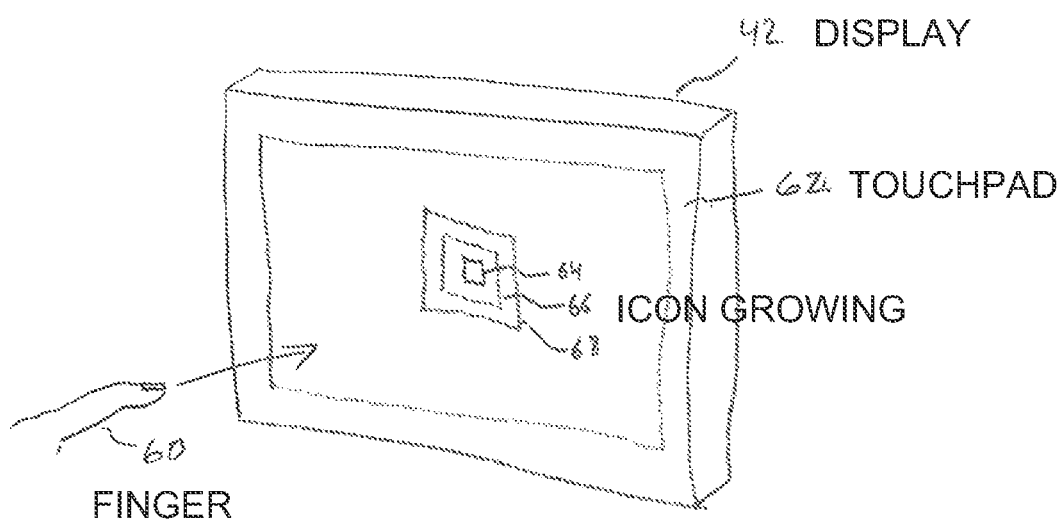
FIG. 5 is a perspective view of a display showing an icon that is growing as a function of the distance of an actuating object from the display.

It should be understood that the touchpad can detect objects as they move, not just at static distances. Thus, the actuating object can be tracked anywhere it moves within a detection range. An example of implementation is provided by the following example. As shown in FIG. 5, consider a display 42. A finger 60 is detected as it approaches the display 42 and touchpad 62 (not shown) disposed within the display. After the finger 60 is detected, an object such as a menu or an icon 64 is displayed, or if already present, begins to grow larger on the display. As the finger approaches the display 42, the icon 64 grows progressively larger as indicated by outline 66 and 68. The size of the icon 64 is made to be a function of the distance of the finger 60 from the display 42. The icon 64 will grow to a maximum size and then grow no larger. Likewise, the icon 64 will decrease in size as a function of distance, out to a maximum distance at which the icon disappears or no longer grows smaller on the display 42.

The icon 64 can be replaced with any object that can be shown on the display 42, such as a menu or a plurality of icons. The concept to be understood is that the size of the object 64 being displayed is a function of distance of the actuating object 62.

It should be apparent that the proximity sensing of the touchstrip 40 is capable of not only detecting the presence of the actuating object, but also of tracking movement. For example, the user might perform a proximity gesture by moving the finger in a back-and-forth waving motion over the touchstrip 40. The waving motion can be used to change the menu as if the user is turning a page. The waving motion of the finger is an example of a gesture made in three-dimensional space above the touchstrip 40.

Another aspect of the present invention is that the touchpad is not limited to a display housing. Thus, the touchpad can be disposed inside of any device that does not interfere with operation of the touchpad. For example, the touchpad could be disposed within an external keyboard of a desktop computer.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. An electronic appliance having a display screen that does not accept touch or proximity input, and comprised of:
   a display screen that does not accept touch or proximity input;
   a display housing for the display screen of an electronic appliance, the display housing being manufactured using materials that enable a capacitive touchpad to operate through the display housing; and
   a capacitive touchpad disposed within the display housing and within an inside surface of an outer edge of the display housing that is not part of the display screen, and wherein the touchpad is capable of detecting and tracking movement of an actuating object that is 1) in proximity of but not in contact with the display housing, wherein proximity detection of the actuating object activates a menu that is shown on the display screen and 2) in contact with the display housing that is not part of the display screen, wherein contact of the actuating object on the display housing causes selection of an object in the menu being displayed.

2. The electronic appliance as defined in claim 1 wherein the touchpad is disposed in a front bezel, a side panel, a rear panel, or any combination of the three locations on the display housing.

3. The electronic appliance as defined in claim 1 wherein the touchpad is further comprised of a multi-layer general purpose design that is capable of detecting and tracking the actuating object in two or three dimensions.

4. The electronic appliance as defined in claim 1 wherein the touchpad is further comprised of a single-layer design that is only capable of detecting and tracking the actuating object in a single dimension.

5. A method of detecting and tracking an actuating object using an electronic appliance, said method comprising the steps of:
   1) providing a display screen that does not accept touch or proximity input, a display housing of an electronic appliance that is manufactured using materials that enable a capacitive touchpad to operate through the display housing, and a capacitive touchpad disposed within the display housing and on an inside surface of an outer edge of the display housing that is not part of the display screen, wherein the touchpad is capable of detecting and tracking movement of an actuating object that is 1) in proximity of but not in contact with the display housing, and 2) in contact with the display housing;
   2) moving the actuating object within a threshold distance of the touchpad to thereby perform a first proximity gesture, wherein the touchpad detects and tracks movement of the actuating object;
   3) activating a first menu of the electronic appliance in response to the first proximity gesture; and
   4) detecting the actuating object when it is in contact with the display housing that is not part of the display screen, and selecting an object on the menu in response to contact with the display housing to thereby make a menu selection.

6. The method as defined in claim 5 wherein the method further comprises the step of disposing the touchpad in a front bezel, a side panel, a rear panel, or any combination of the three locations on the display housing.

7. The method as defined in claim 5 wherein the method further comprises the steps of:

1) providing a multi-layer general purpose touchpad design; and
2) detecting and tracking the actuating object in two or three dimensions.

8. The method as defined in claim 5 wherein the method further comprises the steps of:
1) providing a single-layer touchpad design;
2) detecting and tracking the actuating object in a single dimension.

9. The method as defined in claim 5 wherein the method further comprises the step of detecting and tracking a proximity gesture performed by the actuating object.

10. The method as defined in claim 5 wherein the method further comprises the steps of:
1) performing a second gesture that is either a proximity gesture or a touch gesture; and
2) activating at least a second function or second interface of the electronic appliance in response to the second gesture, wherein the second function or second interface is mutually exclusive of the first function or first interface.

11. The method as defined in claim 5 wherein the method further comprises the steps of:
1) displaying an object on the display in response to the first proximity gesture;
2) moving the actuating object closer to the display; and
3) increasing a size of the object on the display screen as a function of the distance of the actuating object from the display screen, up to a maximum display size.

* * * * *